United States Patent
Young et al.

(10) Patent No.: US 7,357,465 B2
(45) Date of Patent: Apr. 15, 2008

(54) BRAKE PEDAL FEEL SIMULATOR

(75) Inventors: Kent Randolph Young, Waterford, MI (US); David Leslie Agnew, Clarkston, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/958,064

(22) Filed: Oct. 4, 2004

(65) Prior Publication Data
US 2006/0071545 A1    Apr. 6, 2006

(51) Int. Cl.
*B60T 8/34* (2006.01)
(52) U.S. Cl. .............................. 303/113.1; 303/114.1; 303/113.4; 188/357
(58) Field of Classification Search ............ 303/113.1, 303/113.4; 188/357, 358; 74/512, 516, 74/517, 518; 91/391 R; 60/581, 554, 556
See application file for complete search history.

(56) References Cited

U.S. PATENT DOCUMENTS

| 3,633,366 | A | | 1/1972 | Cripe |
| 3,719,123 | A | | 3/1973 | Cripe |
| 3,720,447 | A | * | 3/1973 | Harned et al. ............... 303/176 |
| 4,312,182 | A | * | 1/1982 | Filderman ..................... 60/581 |
| 5,531,509 | A | * | 7/1996 | Kellner et al. ........... 303/114.1 |
| 6,033,035 | A | * | 3/2000 | Neumann et al. ........ 303/113.4 |
| 6,058,705 | A | * | 5/2000 | Schunck ..................... 60/562 |
| 6,139,119 | A | * | 10/2000 | Otomo .................... 303/113.1 |
| 6,309,032 | B1 | | 10/2001 | Kusano et al. |
| 6,347,518 | B1 | * | 2/2002 | Kingston et al. ............. 60/552 |
| 6,953,229 | B2 | * | 10/2005 | Isono et al. ............. 303/114.1 |
| 2002/0108463 | A1 | | 8/2002 | Shaw et al. |
| 2005/0001476 | A1 | * | 1/2005 | Kusano ................... 303/113.4 |

* cited by examiner

*Primary Examiner*—Robert A. Siconolfi
*Assistant Examiner*—Mariano Sy

(57) ABSTRACT

A brake pedal feel simulator is provided which reduces the simulation force provided to the brake pedal during emergency or failed conditions. The simulator generally comprises a first spring having a first spring rate and a second spring having a second spring rate. The second spring rate is selected to be lower than the first spring rate. When a predetermined force level is achieved at the brake pedal and simulator, the spring rate provided by the simulator shifts to the second spring rate. In this manner, the rate resistance to translation of the brake pedal is reduced, thereby improving the operator's ability to brake the vehicle.

20 Claims, 3 Drawing Sheets

BRAKE PEDAL FEEL SIMULATOR

FIELD OF THE INVENTION

The present invention relates generally to brake pedal feel simulators for providing a simulation braking force to a brake pedal of a motor vehicle, and more particularly relates to operation of such a brake pedal feel simulator during failed or emergency braking conditions.

BACKGROUND OF THE INVENTION

Electronic brake systems, such as so-called "brake by wire" systems, are increasingly being integrated into or replacing conventional hydraulic brake systems of motor vehicles including passenger cars, SUV's and light trucks. Such electronic brake systems are preferable because they reduce the mass of the system, provide greater ability to integrate the system into the vehicle's other electronic circuits and controls, and are suited for use with sophisticated brake control systems.

During depression of the brake pedal by a vehicle operator in a conventional hydraulic braking system, the hydraulic fluid will exert a reaction force back on the brake pedal due to the hydraulic pressure in the brake lines. Since an electronic brake system may not have such hydraulic pressure at the brake pedal, the vehicle operator will not detect any countering force, which in turn can disorient the operator. Accordingly, a typical electronic brake system will include a brake pedal feel simulator to provide a simulation force on the brake pedal. The simulation force provided by the simulator acts opposite the brake pedal force generated by the vehicle operator and helps the operator modulate the system.

The Applicants have discovered a drawback to such brake pedal feel simulators in electronic brake systems which rely on brake pedal force as an element of actuating the wheel brakes. During emergency conditions or failure conditions, the brake pedal feel simulator continues to oppose the depression of the brake pedal by the operator, and hence reduces the amount of force transmitted through the brake pedal. As used herein, emergency conditions are defined as situations where a large amount of braking force is required in a short period of time, and generally including brake pedal forces greater than 200 N. As used herein, failure conditions are defined as a power failure or the failure of brake boosters to supplement the braking force, which also generally include high brake pedal forces greater 200 N. Thus, the simulator opposes the operation at times when high brake forces are needed.

Accordingly, there exists a need to provide a brake pedal feel simulator which automatically adjusts its operation to reduce the simulation force during emergency or failure conditions.

BRIEF SUMMARY OF THE INVENTION

The present invention provides a brake pedal feel simulator which reduces the simulation force provided to the brake pedal during emergency or failed conditions. The simulator generally comprises a first spring having a first spring rate and a second spring having a second spring rate. The first spring receives force from and provides force to the brake pedal. The second spring receives force from and provides force to the first spring. The second spring rate is selected to be lower than the first spring rate. When a predetermined force level is achieved at the brake pedal and simulator, the spring rate provided by the simulator shifts to the second spring rate. In this manner, the rate of resistance to translation of the brake pedal is reduced, thereby improving the operator's ability to brake the vehicle.

According to more detailed aspects, the second spring is pre-loaded to a predetermined force level. The predetermined force level is greater than the force required to begin loading the first spring. Preferably, the first spring is not pre-loaded or is pre-loaded to a force level less than the predetermined force level of the pre-loaded second spring. The predetermined force level is selected to be greater than or equal to a minimum brake pedal force achieved during an emergency braking condition or a non-assisted braking condition or a failed power condition. Generally, the predetermined force level is set in the range of 200 to 500 N.

A spring seat may be used to receive adjacent ends of the first and second springs. A housing enclosing the springs may include a stop to limit the axial movement of the spring seat and provide the pre-load on the second spring. The springs may be selected from any known material or structure having spring properties, including compression springs, tension springs and elastomeric springs, and the first spring may be a variable rate spring or a series of springs to provide a variable rate.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
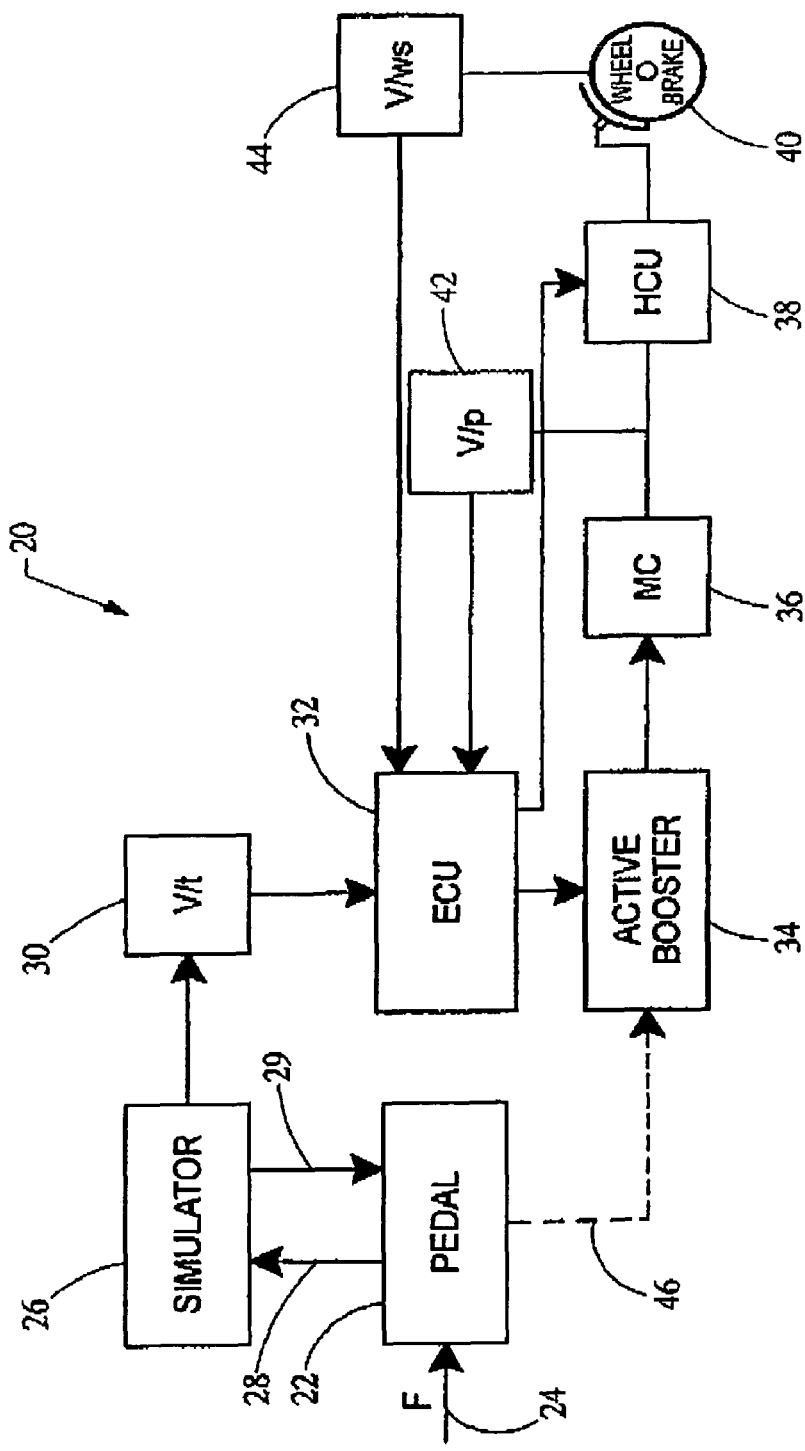
FIG. 1 is a schematic depiction of an electronic brake system having a simulator constructed in accordance with the teachings of the present invention.

Turning now to the figures, FIG. 1 schematically depicts an electronic braking system 20 having a simulator 26 constructed in accordance with the teaching of the present invention. The braking system 20 generally includes a brake pedal 22 receiving an input force denoted by arrow 24 from the operator of the vehicle. The operator force 24 is transmitted through the pedal 22 to the simulator brake pedal feel simulator 26 which also transmits a simulation force 29 back to the brake pedal 22. A displacement sensor 30 is used to monitor pedal travel and transmits a corresponding signal to an electronic control unit 32 which represents the central control of the braking system 20. The electronic control unit 32 sends a control signal to an active booster 34, which in turn is mechanically linked to a master cylinder 36. The master cylinder 36 is hydraulically connected to the wheel brake 40 through a hydraulic control unit 38 and booster 34 which together regulate the braking force at the wheel brake 40. The hydraulic control unit 38 and booster 34 receive control signals from the electronic control unit 32 for this operation. A pressure sensor 42 is used to detect the hydraulic pressure in the brake line and provides a signal back to the electronic control unit 32. Similarly, a speed sensor 44 is used to detect wheel speed and provide this information to the electronic control unit 32 for control purposes.

It can be seen in FIG. 1 that the brake pedal 22 is mechanically disconnected from the booster 34 and master cylinder 36 during normal operation. However, as indicated by the dashed line 46, during a failure condition, the mechanical connection between the brake pedal 22 and booster 34 is restored in the unlikely event the electronic control unit 32 is unable to effectuate a braking force at the wheel brake 40.

In previous simulators, the simulator provides a steadily increasing simulation force as the pedal travel increases. This has been depicted in the graph of FIG. 2 which shows the simulation force on the X-axis 50 and the pedal travel on the Y-axis 52. The simulation force from the simulator 26, and in particular the spring rate of the simulator 26, affects the relationship between pedal travel and pedal force as represented by the line 54 in the graph. Arrowed line 56 represents the range of typical pedal force levels during normal braking conditions, while arrowed line 58 represents a range of pedal force that is generally only achieved during emergency conditions, non-assisted conditions or failure conditions. The first range 56 can be loosely defined as forces between 0 and 200 N, while range 58 can be generally considered 200 N and greater.

In the typical simulator, the spring rate (defined as the ratio of force to travel) determines the slope of line 54, and a single spring typically provides approximately a constant spring rate e.g. as line 54 would follow a straight line represented by line 54a and dash line 60. To the extent that a variable rate spring is used, line 54 would curve downwardly to represent an increasing spring rate since increasing force would be required to effectuate pedal travel. According to the present invention, however, upon reaching a predetermined force 57, the simulator 26 provides a lower spring rate curving the line 54 upwardly to representing larger pedal travel per unit force. Preferably, this predetermined force 57 is set in the extended range 58 generally only achieved during emergency, non-assisted, or failed conditions. Accordingly, it can be seen that the present invention reduces the spring rate to decrease the simulation force as compared with a constant rate simulator and gain an additional force margin represented by area 62 on the graph of FIG. 2. In this way, the resistance to the operator's force 24 provided by the simulator 26 is reduced to permit more braking force to be applied to booster 34 and the wheel brake 40.

Figure 2:
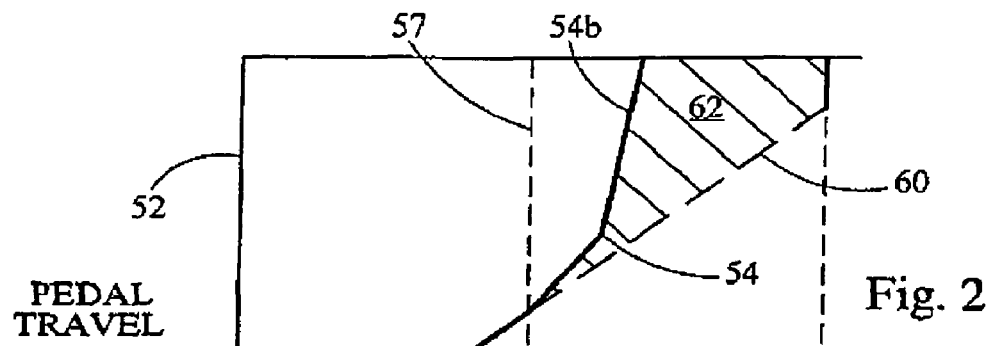
FIG. 2 is a graph depicting the pedal travel versus brake pedal force as affected by the simulator of FIG. 1.
Figure 3:
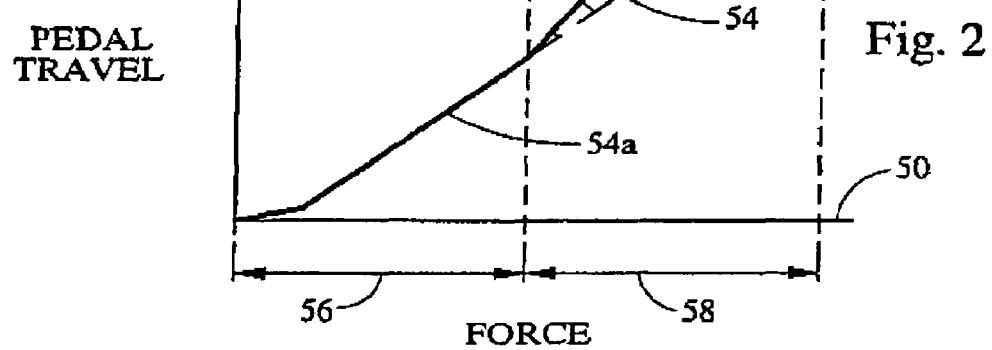
FIG. 3 is a cross-sectional view of the simulator of FIG. 1.

Turning now to FIG. 3, a cross-sectional view of the simulator 26 which achieves the benefits noted above in the discussion of FIG. 2. The brake pedal force 28 is transmitted to the simulator 26 through an input rod 15, as is known in the art. The simulator 26 receives the force from input rod 15 via a spring assembly comprising first spring seat 80, second spring seat 82, first spring 84 and second spring 86. The spring seats 80, 82 and springs 84, 86 are contained within a housing 70 that defines a first passageway 72 receiving in the first spring 84, and a second passageway 74 receiving the second spring 86. The second spring 86 presses against a back wall 78 of the housing 70 and extends forwardly to engage the second spring seat 82. A shoulder 76 is formed between the first and second passageways 72, 74 to thereby restrict the axially forward motion of the second spring seat 82. The second spring seat 82 is interposed between adjacent ends of the first and second springs 84, 86, while the first spring seat 80 receives the forward end of the first spring 84. A front wall or shoulder 77 of the housing 70 restricts the forward axial motion of the first spring seat 80.

The first spring 84 has a first spring rate while the second spring 86 has a second spring rate. The second spring rate is set to be lower than the first spring rate. The springs 84, 86 shown have been depicted as compression springs, although it will be recognized by those skilled in the art that numerous types of springs may be employed, including tension springs, elastomer springs and variable rate springs. In order to insure compression of the first spring 84 prior to compression of the second spring 86 during application of brake pedal force through input rod 15, and thus to achieve the reduction and simulation force only at higher forces, the second spring 86 is preloaded to a predetermined force level. The predetermined level is set to be greater than the force required to begin loading the first spring 84. As indicated in the graph of FIG. 2, the predetermined force level 57 is set to be greater than or equal to a minimum brake pedal force achieved during either an emergency braking condition, a non-assisted condition, or a failure condition, which is typically in the extended range 58 of between 200 and 500 N. Thus, only upon reaching this predetermined force level 57, will the second spring 86 begin to compress, but at a lesser spring rate than is initially provided by first spring 84. In this manner, at certain high brake pedal forces, the simulation force will decrease due to a decrease in the spring rate of the simulator 26. In this manner, the additional force margin 62 may be gained automatically with the simulator 26 of the present invention.

Figure 4:
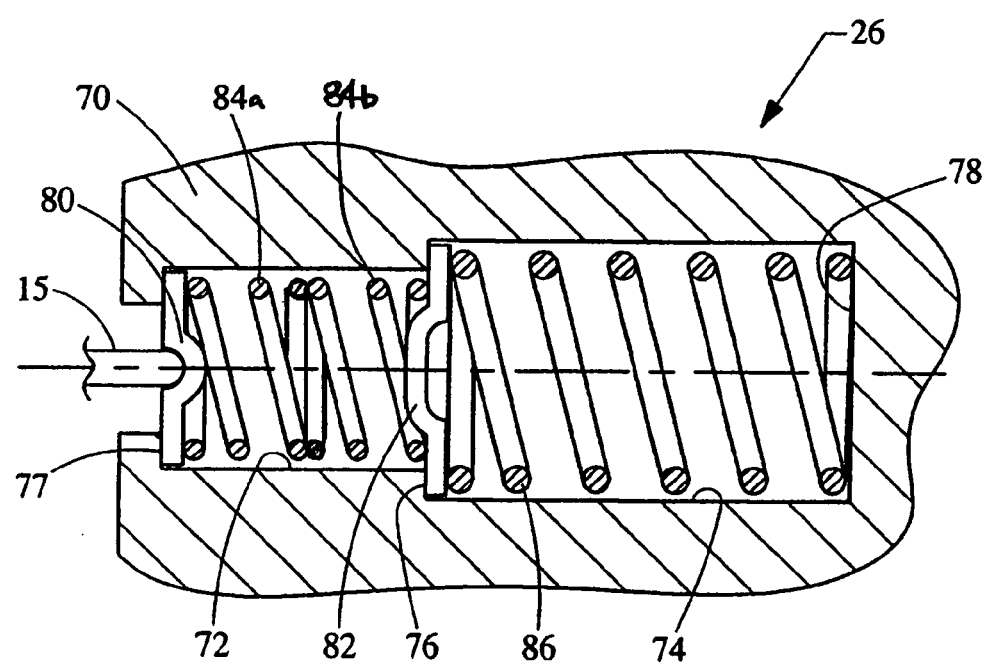
FIG. 4 is a cross-sectional view of an alternate embodiment of a simulator constructed in accordance with the teachings of the present invention.

It will also be recognized that the first spring 84 could comprise a variable rate spring to provide a variable slope to the initial portion 54A of the travel vs. force line 54. Similarly, a set or series of springs 84a, 84b (FIG. 4) could be used to provide a variable rate during normal braking conditions, i.e. to replace spring 84. It will also be recognized by those skilled in the art that third and fourth and more springs could be added in series, each successive spring having a lower spring rate but being preloaded such that each begins compressing at different force levels. In this manner, the travel force line of FIG. 2 could be increasing in a number of segments (representing a reduction in spring rate in several segments) to further stage the reduction in simulation force and increase the force margin gained.

Accordingly, it will be recognized by those skilled in the art that the simulator of the present invention provides a reduction in simulation force during high brake force levels which are generally selected to represent emergency, non-assisted and failed conditions which require very high brake pedal forces. This results in a force margin which is gained automatically without requiring any special switch or electronic devices, although such mechanisms could be readily employed in conjunction with the present invention.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A brake pedal feel simulator for a vehicle braking system having a brake pedal, the simulator providing a simulation force to the brake pedal, the simulator comprising:
a first spring having a first spring rate, the first spring positioned to receive force from and provide force to the brake pedal;
a second spring having a second spring rate, the second spring positioned to receive force from and provide force to the brake pedal;
the second spring rate being lower than the first spring rate; and
the first spring determining the simulation force during movement of the brake pedal over a first force range and the second spring determining the simulation force during movement of the brake pedal over a second force range, the forces in the first force range being less than the forces in the second force range.

2. The simulator of claim 1, wherein the second spring is pre-loaded to a predetermined force level.

3. The simulator of claim 2, wherein the predetermined force level is greater than the force required to begin loading the first spring.

4. The simulator of claim 2, wherein the first spring is not pre-loaded or is pre-loaded to a force level less than the predetermined force level of the pre-loaded second spring.

5. The simulator of claim 2, wherein the predetermined force level is greater than or equal to a minimum brake pedal force achieved during an emergency braking condition.

6. The simulator of claim 2, wherein the predetermined force level is greater than or equal to a minimum brake pedal force achieved during a non-assisted braking condition or a failed power condition.

7. The simulator of claim 1, wherein the relation between the simulation force and the movement of the brake pedal is given by the first spring during normal driving conditions.

8. The simulator of claim 1, wherein the first and second springs are axially aligned.

9. The simulator of claim 1, further comprising a spring seat receiving adjacent ends of the first and second springs.

10. The simulator of claim 9, further comprising a housing enclosing the first and second springs, the housing including a stop to limit the axial movement of the spring seat in at least one axial direction.

11. The simulator of claim 10, wherein the stop is positioned to provide a pre-load on the second spring.

12. The simulator of claim 10, further comprising an input rod connected to the brake pedal, and wherein the input rod engages a second spring seat, the second spring seat receiving an end of the first spring.

13. The simulator of claim 12, wherein the housing includes a second stop to limit the axial movement of the second spring seat in at least one axial direction.

14. The simulator of claim 1, wherein the ratio of movement of the brake pedal to the simulation force increases beyond the predetermined force.

15. The simulator of claim 1, wherein the first spring is a variable rate spring.

16. The simulator of claim 1, wherein at least one of the first and second springs are compression springs.

17. The simulator of claim 1, wherein at least one of the first and second springs are tension springs.

18. The simulator of claim 1, wherein at least one of the first and second springs is an elastomeric spring.

19. The simulator of claim 1, wherein the first spring includes a series of springs to provide a variable spring rate.

20. The simulator of claim 1, wherein the first force range is from zero to a predetermined force level, and the second force range is above the predetermined force level.

* * * * *